United States Patent [19]

Phillion

[11] Patent Number: 5,738,366
[45] Date of Patent: Apr. 14, 1998

[54] CHUTE STRUCTURE FOR AN INFLATABLE VEHICLE OCCUPANT RESTRAINT

[75] Inventor: Jack A. Phillion, Shelby Township, Mich.

[73] Assignee: TRW Vehicle Safety Systems Inc., Lyndhurst, Ohio

[21] Appl. No.: 496,621

[22] Filed: Jun. 29, 1995

[51] Int. Cl.⁶ .............. B60R 21/20; B60R 21/22
[52] U.S. Cl. ................... 280/728.2; 280/728.3; 280/732
[58] Field of Search .............. 280/728.2, 728.3, 280/732, 730.1, 728.1

[56] References Cited

U.S. PATENT DOCUMENTS

| | | | |
|---|---|---|---|
| 5,096,221 | 3/1992 | Combs et al. | 280/732 |
| 5,135,252 | 8/1992 | Suran et al. | 280/728.2 |
| 5,234,227 | 8/1993 | Webber | 280/728.2 |
| 5,242,192 | 9/1993 | Prescaro et al. | 280/732 |
| 5,263,739 | 11/1993 | Webber et al. | 280/728.2 |
| 5,275,432 | 1/1994 | Pray et al. | 280/728.2 |
| 5,295,707 | 3/1994 | Satoh et al. | 280/728.2 |
| 5,351,987 | 10/1994 | Donegan et al. | 280/728.2 |

FOREIGN PATENT DOCUMENTS

5-294197  11/1993  Japan ................. 280/728.2

Primary Examiner—Anne Marie Boehler
Assistant Examiner—Peter C. English
Attorney, Agent, or Firm—Tarolli, Sundheim, Covell, Tummino & Szabo

[57] ABSTRACT

An apparatus for use with an inflatable vehicle occupant restraint (18) includes a chute structure (26) and a deployment door (24). The deployment door (24) has a pivotal door panel (100) and a flange (102) projecting from the door panel (100). The chute structure (26) and the flange (102) together define a chute passage (28) through which the restraint (18) moves outward toward the door panel (100) when inflating. The chute structure (26) includes a plurality of chute panels (150,152,154) having installed positions in which the chute panels (150,152,154) define peripheral sides of the chute passage (28). Adjacent pairs of the chute panels (150,152,154) are joined together along fold lines (170,172), and are pivotal about the fold lines (170,172) relative to each other for movement to their installed positions.

13 Claims, 5 Drawing Sheets

CHUTE STRUCTURE FOR AN INFLATABLE VEHICLE OCCUPANT RESTRAINT

FIELD OF THE INVENTION

The present invention relates to a chute structure for directing movement of an inflatable vehicle occupant restraint when the restraint is being inflated.

BACKGROUND OF THE INVENTION

An inflatable vehicle occupant restraint, such as an air bag, is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains an occupant of the vehicle from forcefully striking parts of the vehicle as a result of the collision.

An air bag and an inflator are typically assembled together as parts of an air bag module. In addition to the air bag and the inflator, the module includes a reaction canister which contains and supports the air bag and the inflator in the vehicle. The reaction canister has a deployment opening through which the air bag moves outward from the reaction canister when the air bag is inflating. A deployment door is fastened to the reaction canister, and extends over the deployment opening to conceal the air bag and the other parts of the module from the vehicle occupant compartment.

When the inflator is actuated, the reaction canister directs the inflation fluid to flow from the inflator into the air bag. As the inflation fluid enters the air bag, it moves the air bag outward through the deployment opening and forcefully against the deployment door. A rupturable portion of the deployment door is ruptured by the force of the fluid pressure in the air bag. A panel portion of the deployment door is then released for pivotal movement away from the deployment opening. As the air bag continues to move outward against the deployment door, it forcefully deflects a hinge portion of the deployment door so as to move the panel portion pivotally away from the deployment opening. The deployment door is thus opened and moved out of the path of the air bag as the air bag inflates outward from the reaction canister through the deployment opening and into the vehicle occupant compartment.

SUMMARY OF THE INVENTION

In accordance with the present invention, an apparatus for use with an inflatable vehicle occupant restraint comprises a pivotal deployment door panel. The apparatus further comprises chute means for defining a chute passage through which the restraint moves toward the door panel when the restraint is being inflated. The chute means comprises a plurality of chute panels. The chute panels have installed positions in which they define peripheral sides of the chute passage.

The chute means further comprises means for defining a plurality of fold lines along which adjacent pairs of the chute panels are joined together. The chute panels are pivotal about the fold lines relative to each other upon installation in their installed positions.

In the preferred embodiments of the present invention, the door panel is a pivotal portion of a deployment door, and the deployment door has a flange which projects inward from the door panel. The chute panels and the flange on the deployment door together define the chute passage. Specifically, the chute passage has a rectangular peripheral shape with four sides. The flange extends along one side of the chute passage. The chute panels include first, second, and third chute panels which extend along the other three sides of the chute passage between the opposite ends of the flange.

In one preferred embodiment of the present invention, the chute means further includes an attachment panel. The attachment panel is joined to one of the chute panels along a pivotal fold line, and has a plurality of apertures for receiving fasteners. The fasteners securely fasten the attachment panel, and hence the chute panels, to the door panel. In another preferred embodiment of the present invention, the chute panels and the door panel are joined to each other as integral portions of a continuous piece of injection molded plastic material.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
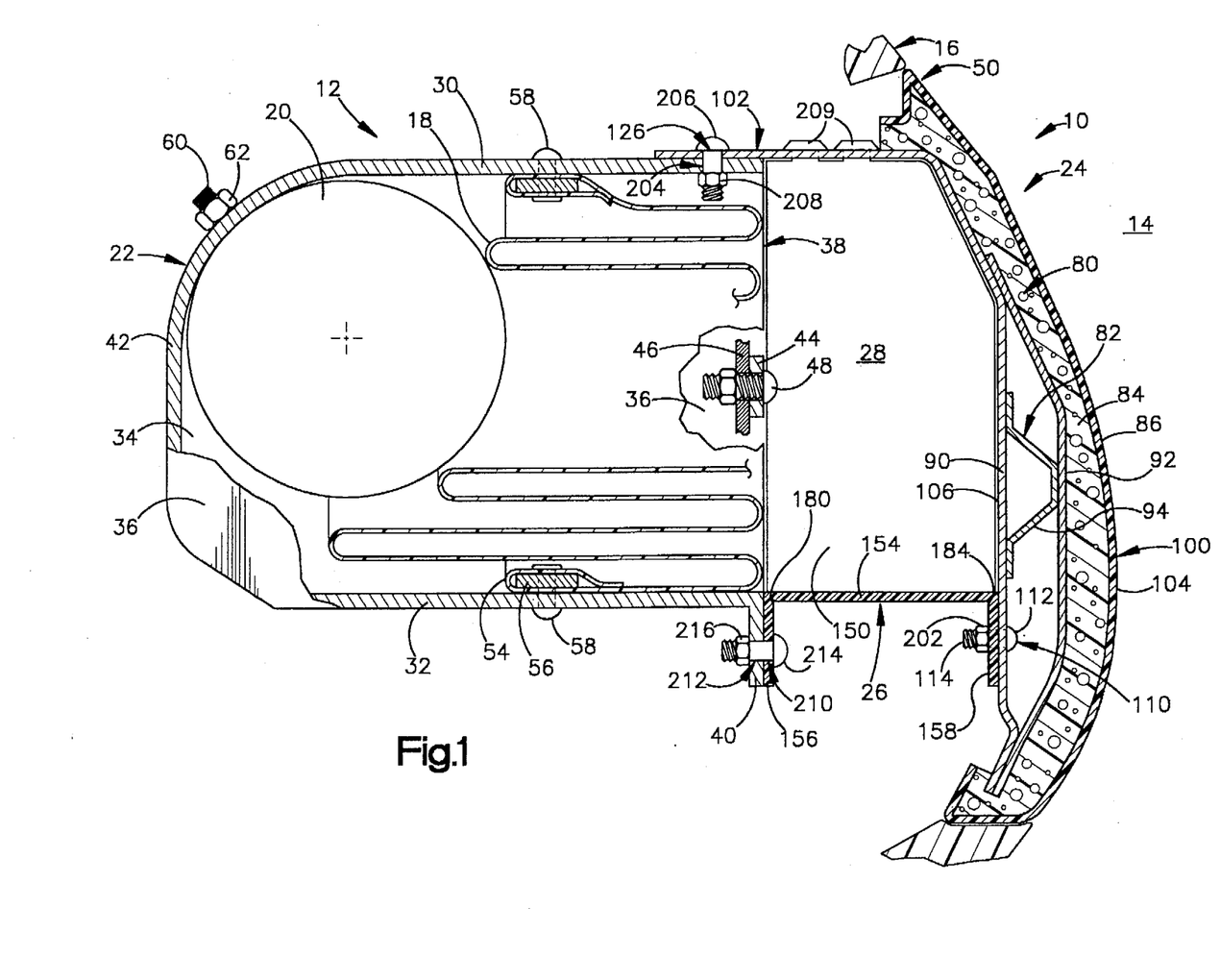
FIG. 1 is a schematic view of a vehicle occupant restraint apparatus comprising a preferred embodiment of the present invention.

As shown in FIG. 1, a vehicle occupant restraint apparatus 10 comprising a first embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes a particular type of inflatable vehicle occupant restraint 18 which is commonly referred to as an air bag. The air bag module 12 also includes an inflator 20 for inflating the air bag 18.

Figure 2:
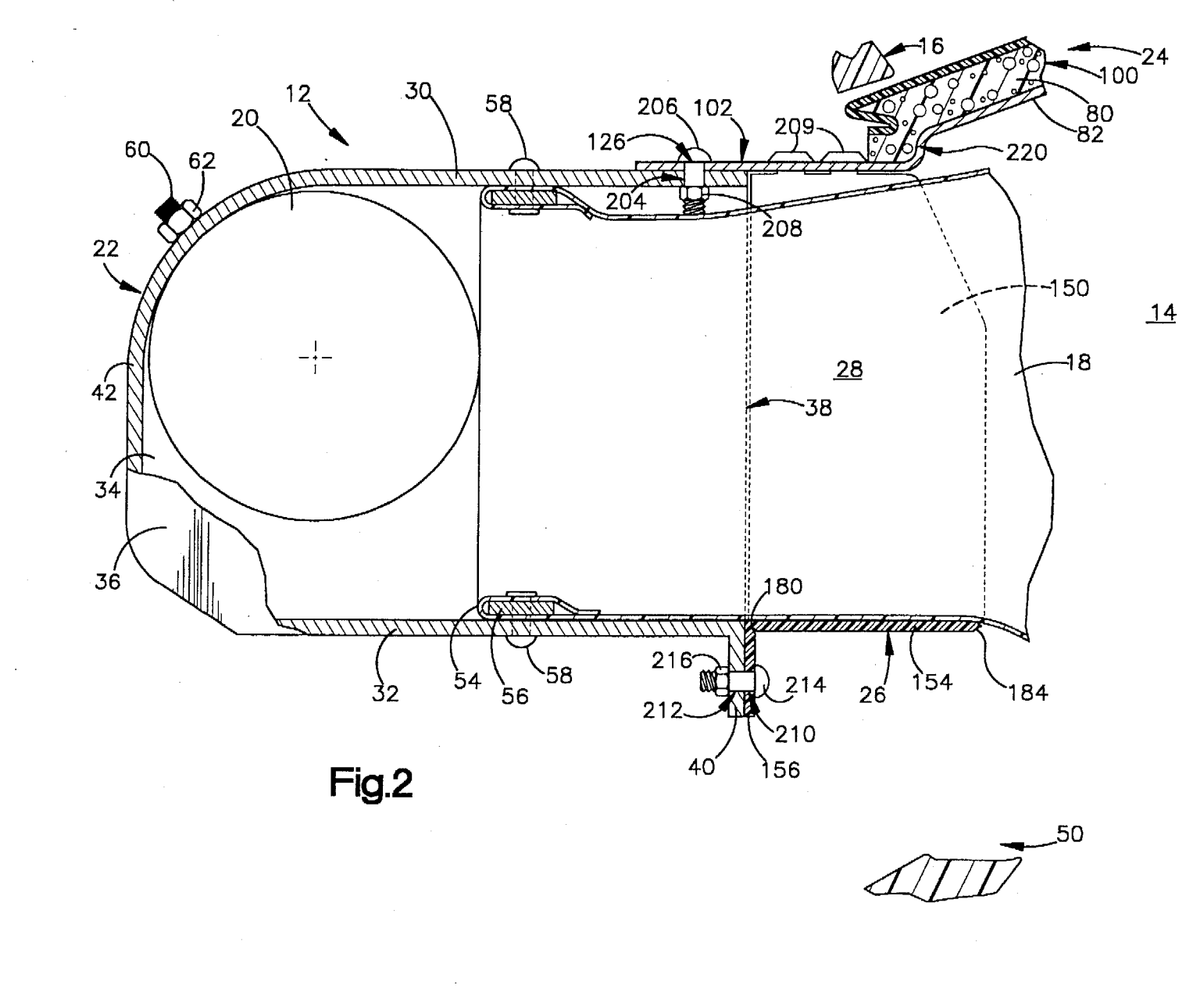
FIG. 2 is a view showing the apparatus of FIG. 1 in an actuated condition.

When the inflator 20 is actuated, it inflates the air bag 18 from an uninflated condition, as shown fully in FIG. 1, to an inflated condition, as shown partially in FIG. 2. When the air bag 18 is in the inflated condition, it extends from the instrument panel 16 into the vehicle occupant compartment 14 to restrain movement of a vehicle occupant toward the instrument panel 16. The air bag 18 thus helps to protect the occupant from a forceful impact with the instrument panel 16 or other parts of the vehicle.

The air bag module 12 further includes a reaction canister 22, a deployment door 24, and a chute structure 26 which is located between the reaction canister 22 and the deployment door 24. The reaction canister 22 contains the air bag 18 and the inflator 20. The deployment door 24 and the chute structure 26 together define a chute passage 28 between the reaction canister 22 and the deployment door 24.

The reaction canister 22 has an upper wall 30, a lower wall 32, and a pair of opposite side walls 34 and 36. The upper, lower, and side walls 30, 32, 34 and 36 of the reaction canister 22 together define a deployment opening 38 at the outer end of the reaction canister 22. A mounting flange portion 40 of the lower wall 32 projects downward from the deployment opening 38. An inner wall 42 closes the inner end of the reaction canister 22 opposite the deployment opening 38.

A plurality of mounting tabs 44, one of which is shown in FIG. 1, project from the reaction canister 22. The mounting tabs 44 are fixed to corresponding supporting parts 46 of the instrument panel 16 by fasteners 48. The structure and arrangement of the fasteners 48, the mounting tabs 44, and the supporting parts 46 of the instrument panel 16 can vary, as known in the art. The reaction canister 22 is mounted in the instrument panel 16 in a position in which the deployment opening 38 is spaced inward from a somewhat larger opening 50 in the instrument panel 16. Although the reaction canister 22 is shown as a separate structure which is mounted in the instrument panel 16, such a canister could alternatively be defined by the structure of the instrument panel 16, or by another part of the vehicle from which the air bag 18 or other inflatable vehicle occupant restraint is to be inflated into the occupant compartment 14.

As noted above, the air bag 18 is stored in the reaction canister 22 in the uninflated condition of FIG. 1. An open inner end portion 54 of the air bag 18 is wrapped around and secured to a retainer ring 56 in a known manner. The retainer ring 56 extends fully around the inside of the reaction canister 22 at a location between the inflator 20 and the deployment opening 38. A plurality of fasteners, such as rivets, 58 fasten the retainer ring 56 and the air bag 18 to the surrounding walls 30, 32, 34 and 36 of the reaction canister 22 at that location.

The inflator 20 is an elongated cylindrical structure comprising a source of inflation fluid for inflating the air bag 18. As known in the art, the inflator 20 may contain an ignitable gas generating material which, when ignited, rapidly generates a large volume of gas. The inflator 20 may alternatively contain a stored quantity of pressurized inflation fluid, or a combination of pressurized inflation fluid and ignitable material for heating the inflation fluid.

The inflator 20 extends longitudinally between the opposite side walls 34 and 36 of the reaction canister 22. A threaded mounting stud 60 on the inflator 20 projects radially outward through an opening (not shown) in the inner wall 42 of the reaction canister 22. A nut 62 on the mounting stud 60 attaches the inflator 20 securely to the reaction canister 22. Alternatively, the inflator 20 could be mounted in the reaction canister 22 by any other suitable mounting structure known in the art.

Figure 3:
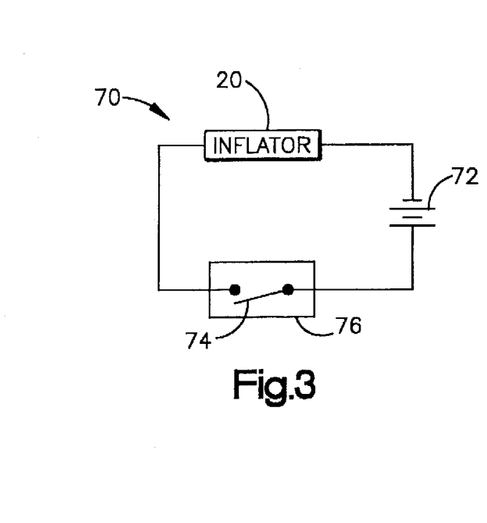
FIG. 3 is a schematic view of an electrical circuit including a part of the apparatus of FIG. 1.

As shown in FIG. 3, the inflator 20 is included in an electrical circuit 70. The electrical circuit 70 further includes a power source 72, which is preferably the vehicle battery and/or a capacitor, and a normally open switch 74. The switch 74 is part of a sensor 76 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 18 is desired to protect an occupant of the vehicle. The sensor 76 then closes the switch 74, and the inflator 20 is actuated electrically.

When the inflator 20 is actuated, it emits a large volume of inflation fluid into the reaction canister 22. The reaction canister 22 directs the inflation fluid from the inflator 20 into the air bag 18 to inflate the air bag 18 from the uninflated condition of FIG. 1 to the inflated condition of FIG. 2. As the air bag 18 begins to inflate, it moves rapidly outward from the reaction canister 22 through the deployment opening 38 and into the chute passage 28. The inflating air bag 18 moves outward through the chute passage 28 and forcefully against the deployment door 24 to open the deployment door 24.

As shown in FIG. 1, the deployment door 24 comprises a plastic pad 80 on a metal substrate 82. The pad 80 has a compressible foam body 84 which is covered by a flexible outer layer 86. The substrate 82 has a plurality of thin sheet metal parts, including an inner wall member 90, an outer wall member 92, and a reinforcing member 94 interposed between the inner and outer wall members 90 and 92. The foregoing plastic and metal parts of the deployment door 24 are fixed to each other by adhesive bonds and welds (not shown) in a known manner, and can be manufactured and assembled by any suitable process known in the art.

Figure 4:
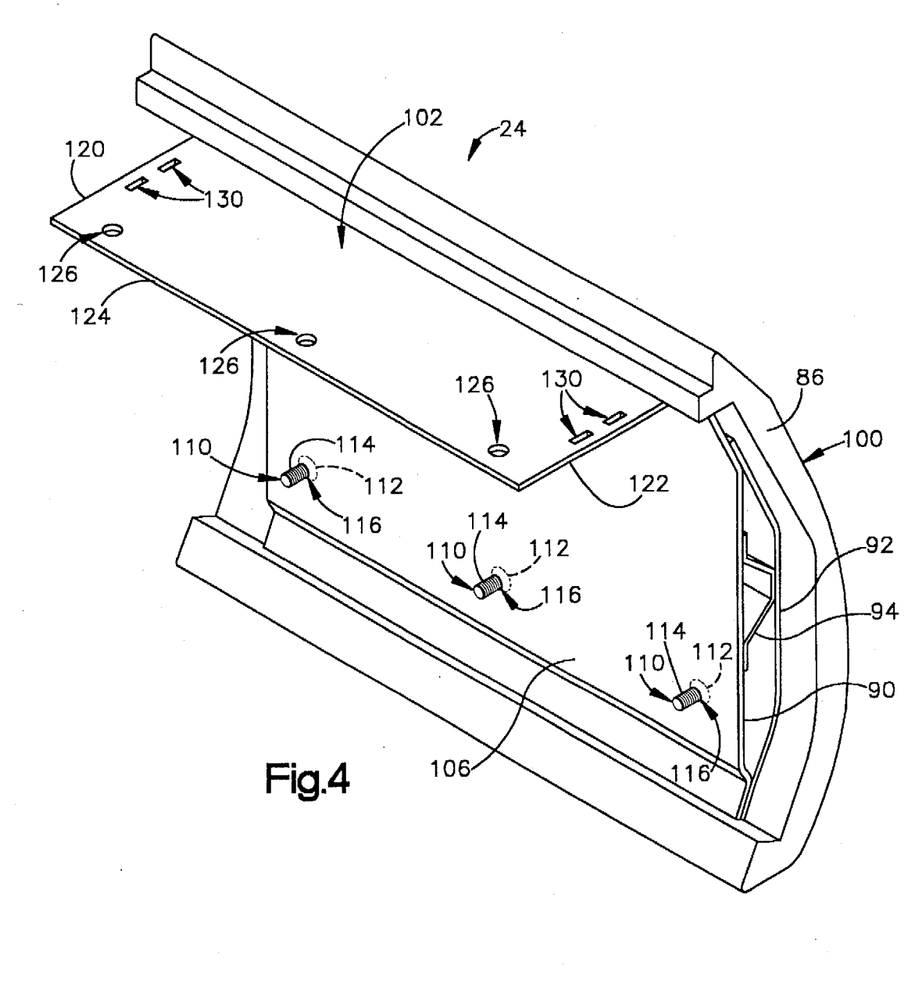
FIG. 4 is a perspective view of a part of the apparatus of FIG. 1.

As shown in FIG. 4, the deployment door 24 has two major portions, including a door panel 100 and a flange 102. The door panel 100 has a generally rectangular peripheral shape which is elongated horizontally. As shown partially in FIG. 1, the door panel 100 extends fully across the opening 50 in the instrument panel 16. An outer side surface 104 of the door panel 100 is defined by the plastic outer layer 86. The outer side surface 104 continues the trim theme of the instrument panel 16 across the opening 50. An inner side surface 106 of the door panel 100 is defined by the metal inner wall member 90. The inner side surface 106 faces inward through the chute passage 28 toward the reaction canister 22 and the air bag 18.

A plurality of fasteners, such as bolts 110, are supported on the door panel 100. As shown in FIG. 4, the bolts 110 are arranged in a horizontal row extending along the inner wall member 90 near the bottom of the door panel 100. Each bolt 110 has a head 112 and a threaded shaft 114. The heads 112 on the bolts 110 abut the inner wall member 90 in the space between the inner and outer wall members 90 and 92, and are fixed to the inner wall member 90 by welds (not shown). The shafts 114 on the bolts 110 extend through corresponding apertures 116 in the inner wall member 90. The shafts 114 thus project inward from the inner side surface 106 of the door panel 100.

The flange 102 on the deployment door 24 is an extended portion of the inner wall member 90, and projects inward from the door panel 100 near the top of the door panel 100. The flange 102 has a rectangular peripheral shape which is elongated along the length of the door panel 100. Accordingly, the flange 102 has a pair of parallel opposite end edges 120 and 122 which extend inward from the door panel 100, and further has an inner side edge 124 extending longitudinally between the opposite end edges 120 and 122. A plurality of circular apertures 126 extend through the flange 102, and are arranged in a row beside the inner side edge 124. A plurality of rectangular slots 130 also extend through the flange 102. The slots 130 are arranged in pairs near the opposite end edges 120 and 122 of the flange 102.

Figures 5, 6:
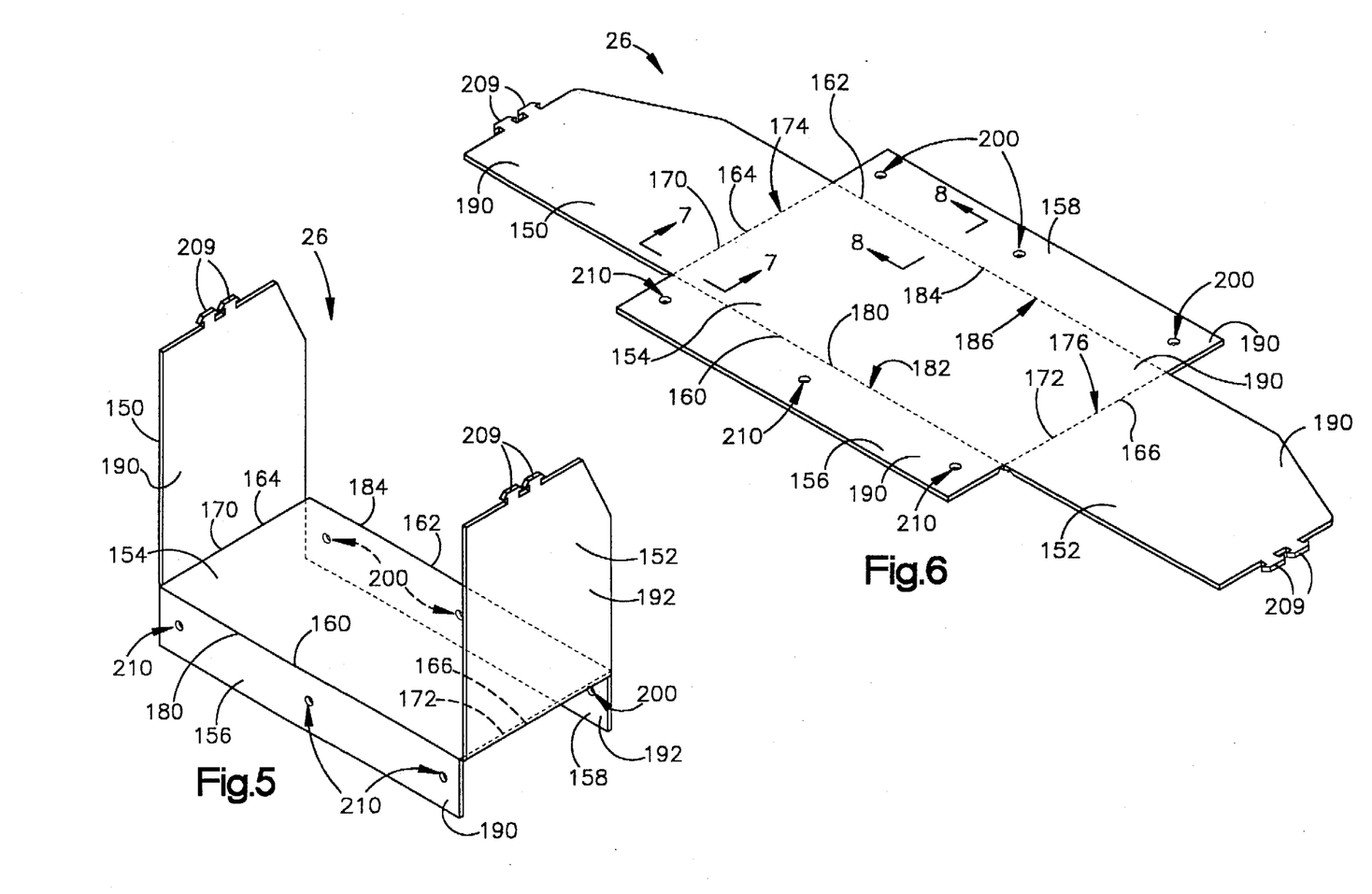
FIG. 5 is a perspective view of another part of the apparatus of FIG. 1.
FIG. 6 is a perspective view showing the part of FIG. 5 in a different configuration.

As described briefly above with reference to FIG. 1, the chute structure 26 is located between the reaction canister 22 and the deployment door 24. When the chute structure 26 is thus installed in the air bag module 12, it partially defines the chute passage 28. The chute structure 26 then has a somewhat channel-shaped configuration, as shown separately in FIG. 5. However, the chute structure 26 initially has the configuration of a flat sheet, as shown in FIG. 6, before being installed in the air bag module 12. In accordance with a principal feature of the present invention, the chute structure 26 is folded from the initial configuration of FIG. 6 to the installed configuration of FIG. 5 upon assembly of the air bag module 12, as described fully below.

The chute structure 26 is preferably constructed as a single continuous piece of material. The material of which the chute structure 26 is formed may have any suitable composition known in the art, but is preferably an injection molded plastic material. With further reference to FIG. 6, the chute structure 26 comprises a plurality of distinct panels which are joined together as integral portions of the continuous piece of plastic material. The panels include three chute panels 150, 152 and 154 for defining three corresponding sides of the chute passage 28. The panels further include two attachment panels 156 and 158 for attachment of the chute structure 26 to the reaction canister 22 and the deployment door 24.

The third chute panel 154 is located at the center of the chute structure 26, as shown in FIG. 6, and has a rectangular peripheral shape. A pair of parallel opposite side edges 160 and 162 of the third chute panel 154 extend along its length between a pair of parallel opposite end edges 164 and 166.

Figure 7:
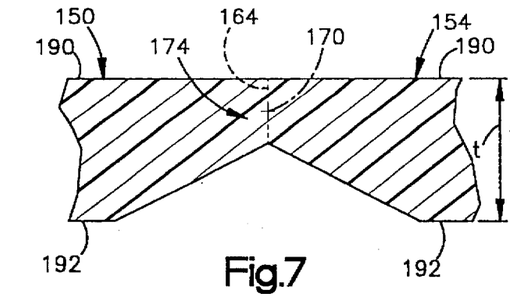
FIG. 7 is a view taken on line 7—7 of FIG. 6.

The first and second chute panels 150 and 152 are joined to the third chute panel 154 along first and second fold lines 170 and 172, respectively. The first fold line 170 is longitudinally coextensive with the first end edge 164 of the third chute panel 154. The second fold line 172 is longitudinally coextensive with the second end edge 166 of the third chute panel 154. As shown in FIG. 7, the first fold line 170 and the first end edge 164 are both defined by a relatively thin, narrow section 174 of the plastic material which is located between the first and third chute panels 150 and 154. The second fold line 172 and the second end edge 166 are likewise defined by a relatively thin, narrow section 176 (FIG. 6) of the plastic material located between the second and third chute panels 152 and 154. The thin sections 174 and 176 of plastic material define bendable hinges for pivotal movement of the first and second chute panels 150 and 152 relative to the third chute panel 154 about the first and second fold lines 170 and 172, respectively.

Figure 8:
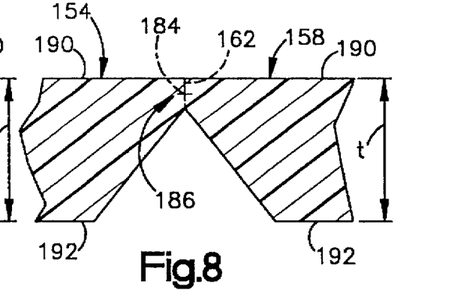
FIG. 8 is a view taken on line 8—8 of FIG. 6.

The first and second attachment panels 156 and 158 have narrow, rectangular peripheral shapes, and project transversely from the first and second side edges 160 and 162 of the third chute panel 154, respectively. A fold line 180 is longitudinally coextensive with the first side edge 160. The fold line 180 is defined by a relatively thin, narrow section 182 of the plastic material in the same manner as described above with reference to the fold lines 170 and 172. Another fold line 184 is longitudinally coextensive with the second side edge 162, but differs from the fold line 180. As shown in FIG. 8, the fold line 184 is defined by a narrow section 186 of the plastic material which is thinner than the section 174 shown in FIG. 7. In accordance with this feature of the present invention, the thin section 186 of plastic material at the fold line 184 is designed to rupture under stress of a predetermined level. The thin section 186 of plastic material at the fold line 184 is thus designed as a rupturable stress riser as well as a hinge.

As further shown in FIGS. 6–8, each of the panels 150–158 on the chute structure 26 has first and second planar opposite side surfaces 190 and 192. The chute structure 26 further has a constant thickness t (FIGS. 7 and 8) between the opposite side surfaces 190 and 192 at each of the panels 150–158. When the chute structure 26 is in the flat, sheet-like configuration of FIG. 6, the first side surfaces 190 are co-planar with each other. The second side surfaces 192 also are co-planar with each other, and are parallel to the first side surfaces 190. In accordance with this feature of the present invention, the chute structure 26 has a shape which is especially suitable for manufacture in an injection molding process.

When the chute structure 26 is folded from the initial configuration of FIG. 6 to the installed configuration of FIG. 5, any suitable sequence of folding steps can be followed for moving the panels 150–158 from their initial positions to their installed positions. In a preferred sequence of folding steps, the second attachment panel 158 is first moved pivotally downward, as viewed in the drawings, about the adjacent fold line 184 approximately 90° relative to the third chute panel 154. A plurality of apertures 200 in the second attachment panel 158 can then be aligned with, and received over, the threaded shafts 114 (FIG. 4) projecting from the inner side surface 106 of the door panel 100. A corresponding plurality of nuts 202, one of which is shown in FIG. 1, can then be received over the shafts 114 to fasten the second attachment panel 158, and hence the entire chute structure 26, to the deployment door 24.

As further shown in FIG. 1, the flange 102 on the deployment door 24 is placed in an installed position in which it overlies the upper wall 30 of the reaction canister 22. The apertures 126 in the flange 102 are then aligned with corresponding apertures 204 in the upper wall 30, one of which is shown in FIG. 1. Each pair of aligned apertures 126 and 204 receives a corresponding fastener, such as a bolt 206 with a nut 208, for fastening of the flange 102 to the reaction canister 22.

In subsequent folding steps, the first and second chute panels 150 and 152 are moved pivotally upward about the first and second fold lines 170 and 172, respectively, approximately 90° relative to the third chute panel 154. A pair of locking tabs 209 on the first chute panel 150 are then inserted through the slots 130 adjacent the first end edge 120 of the flange 102 on the deployment door 24. A similar pair of locking tabs 209 on the second chute panel 152 are inserted through the slots 130 adjacent the second end edge 122 of the flange 102. The first and second chute panels 150 and 152 are thus fastened to the deployment door 24 in their installed positions.

In another folding step, the first attachment panel 156 is folded downward about the adjacent fold line 180 approximately 90° relative to the third chute panel 154. A plurality of circular apertures 210 on the first attachment panel 156 can then be aligned with a plurality of corresponding apertures 212, one of which is shown in FIG. 1, on the mounting flange portion 40 of the reaction canister 22. Each pair of the aligned apertures 210 and 212 receives a corresponding fastener, such as a bolt 214 with a nut 216, so that the first attachment panel 156 on the chute structure 26 is fastened to the mounting flange portion 40 of the reaction canister 22.

When the chute structure 26 has been installed in the air bag module 12 in the foregoing manner, the chute structure 26 and the deployment door 24 together define the chute passage 28. The chute passage 28 has a rectangular peripheral shape which is elongated along the length of the door panel 100. More specifically, the flange 102 on the deployment door 24 defines a first long side of the chute passage 28. The first and second chute panels 150 and 152 respectively define first and second short sides of the chute passage 28 at opposite ends of the flange 102. The third chute panel 154, which is located transversely opposite the flange 102, defines another long side of the chute passage 28.

The air bag 18 is inflated outward through the deployment opening 38 in the reaction canister 22, as described above. The flange 102 on the deployment door 24 and the three chute panels 150, 152 and 154 then constrain the air bag 18 to remain within the confines of the chute passage 28 as it moves outward from the deployment opening 38 toward the deployment door 24. When the air bag 18 reaches the deployment door 24, the inflation fluid flowing into the air bag 18 causes the air bag 18 to apply a fluid pressure force to the inner side surface 106 of the door panel 100. Some components of the fluid pressure force are transmitted from the door panel 100 to the attachment panel 158 near the bottom of the door panel 100. This induces stress in the thin section 186 of plastic material between the attachment panel 158 and the adjacent chute panel 154. When the stress reaches the predetermined level, the thin section 186 ruptures fully along its entire length. The attachment panel 158 is thus severed from the chute panel 154 along the entire length of the corresponding fold line 184. In this manner, the door panel 100, which is fixed to the attachment panel 158, is released for pivotal movement from the closed position of FIG. 1 to the opened position of FIG. 2.

As shown in FIG. 2, the metal substrate 82 and the plastic pad 80 together define a bendable hinge portion 220 of the deployment door 24. The hinge portion 220 bends under the influence of the fluid pressure force applied to the door panel 100 by the inflating air bag 18. The door panel 100 is thus moved pivotally from the closed position of FIG. 1 to the opened position of FIG. 2 by the air bag 18 as the air bag 18 continues to inflate outward into the vehicle occupant compartment 14.

Figures 9, 10:
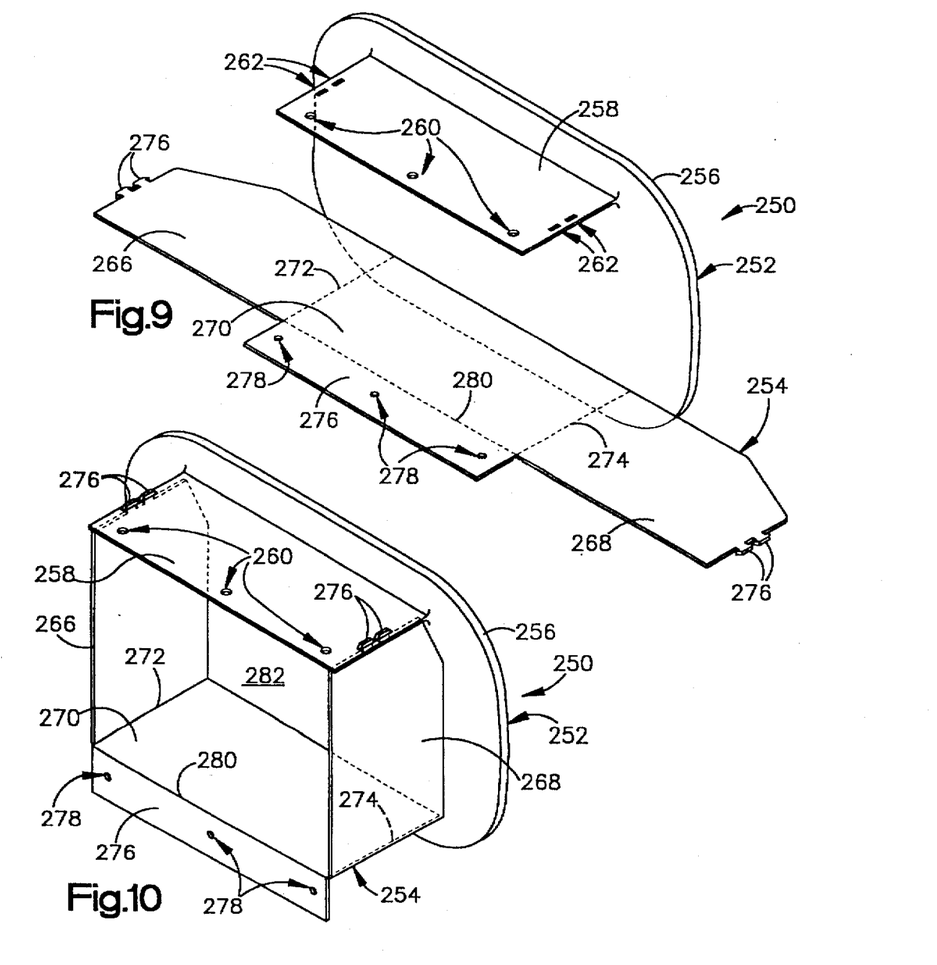
FIG. 9 is a perspective view of a part of a vehicle occupant restraint apparatus comprising a second embodiment of the present invention.
FIG. 10 is a perspective view showing the part of FIG. 9 in a different configuration.

In a second embodiment of the present invention, a vehicle occupant restraint apparatus includes a deployment structure 250, as shown in FIG. 9. The deployment structure 250 is a single continuous piece of material with two distinct portions. One portion of the single continuous piece of material defines a deployment door 252. The other portion defines a chute structure 254. Accordingly, the deployment door 252 and the chute structure 254 are constructed as integral, rather than separate, parts of the deployment structure 250. The material of which the deployment structure 250 is formed may have any suitable composition known in the art, but is preferably an injection molded plastic material.

The deployment door 252 includes a door panel 256. Like the door panel 100 described above, the door panel 256 is designed to extend fully across an opening in a vehicle instrument panel (not shown), and also to continue the trim theme of the instrument panel across the opening. A flange 258 on the deployment door 252 projects inward from the door panel 256 near the top of the door panel 256. The flange 258 has a row of circular apertures 260 like the apertures 126 in the flange 102 described above. The flange 258 also has two pairs of rectangular slots 262 like the slots 130 described above.

The chute structure 254 has first, second and third chute panels 266, 268 and 270. The first and second chute panels 266 and 268 are joined to the third chute panel 270 along first and second fold lines 272 and 274, respectively, and are pivotal relative to the third chute panel 270 in the same manner described above with reference to the first, second and third chute panels 150, 152 and 154. Additionally, locking tabs 276 on the first and second chute panels 266 and 268 are receivable in the slots 262 in the flange 258 in the same manner as described above with reference to the locking tabs 206 and the slots 130.

Since the chute structure 254 is formed integrally with the deployment door 252, the third chute panel 270 is joined directly with the door panel 256 as an integral part of the deployment structure 250, rather than being fastened to the door panel 256 by a fastening structure like the second attachment panel 158 in the chute structure 26 described above. However, the chute structure 254 has an attachment panel 276 which is substantially similar to the first attachment panel 156 in the chute structure 26. The attachment panel 276 has a plurality of circular apertures 278, and is pivotal about a fold line 280 relative to the third chute panel 270.

The chute structure 254 is foldable from an initial configuration, as shown in FIG. 9, to an installed configuration, as shown in FIG. 10, in a manner substantially similar to that described above with reference to folding of the chute structure 26 from its initial configuration to its installed configuration. Accordingly, the flange 258 on the deployment door 252 and the chute panels 266, 268 and 270 on the chute structure 254 together define a rectangular chute passage 282 upon folding of the chute structure 254 from the flat, sheet-like configuration of FIG. 9 to the channel-shaped configuration of FIG. 10. Suitable fasteners can then be received through the apertures 260 and 278 for attachment of the deployment structure 250 to a reaction canister like the reaction canister 22 described above.

From the above description of the invention, those skilled in the art will perceive improvements, changes and modifications. For example, the shape of the reaction canister, the deployment door, and/or the chute structure could vary. The depth of the chute passage between the reaction canister and the deployment door also could vary. The vehicle occupant restraint apparatus could have a different location on the instrument panel, such as a top-mount location. Moreover, a vehicle occupant restraint apparatus may include one or more air bags that inflate upon the occurrence of front, rear, and/or side impacts to the vehicle. The air bags can be mounted in parts of the vehicle other than the instrument panel. Such other parts of the vehicle include, for example, the steering column, the doors, the pillars, the roof, and the seats. A deployment door and an associated chute structure constructed in accordance with the present invention could be used with an air bag at any of those locations. Such improvements, changes and modifications within the skill of the art are intended to be covered by the appended claims.

Having described the invention, the following is claimed:

1. Apparatus for use with an inflatable vehicle occupant restraint, said apparatus comprising:

a pivotal deployment door panel; and chute means for defining a chute passage through which the restraint moves toward said door panel when inflating;

said chute means comprising a plurality of chute panels having installed positions in which said chute panels define peripheral sides of said passage;

said chute means further comprising means for defining a plurality of fold lines along which adjacent pairs of said chute panels are joined together, said chute panels being pivotal about said fold lines relative to each other upon installation of said chute panels in said installed positions;

said passage having a generally rectangular peripheral shape with four sides, said chute panels including first, second and third chute panels for defining first, second and third sides of said passage, respectively;

said chute means further comprising a structure projecting inward from said door panel, said structure defining a fourth side of said passage.

2. Apparatus for use with an inflatable vehicle occupant restraint, said apparatus comprising:

a pivotal deployment door panel; and chute means for defining a chute passage through which the restraint moves toward said door panel when inflating;

said chute means comprising a plurality of chute panels having installed positions in which said chute panels define peripheral sides of said passage;

said chute means further comprising means for defining a plurality of fold lines along which adjacent pairs of said chute panels are joined together, said chute panels being pivotal about said fold lines relative to each other upon installation of said chute panels in said installed positions;

said chute means further comprising an attachment part having means for fastening said chute panels to said door panel, said attachment part being joined to one of said chute panels along a fold line about which said attachment part is pivotal relative to said chute panels upon installation of said chute panels in said installed positions.

3. Apparatus as defined in claim 2, wherein said chute means further comprises rupturable means for rupturing to release said door panel from said one of said chute panels under the influence of the inflating restraint, said rupturable means comprising an elongated stress riser extending along said fold line.

4. Apparatus for use with an inflatable vehicle occupant restraint, said apparatus comprising:

a pivotal deployment door panel; and chute means for defining a chute passage through which the restraint moves toward said door panel when inflating;

said chute means comprising a plurality of chute panels having installed positions in which said chute panels define peripheral sides of said passage;

said chute means further comprising means for defining a plurality of fold lines along which adjacent pairs of said chute panels are joined together, said chute panels being pivotal about said fold lines relative to each other upon installation of said chute panels in said installed positions;

said chute panels and said door panel being portions of a single continuous piece of material.

5. Apparatus as defined in claim 4 wherein said fold lines are defined by relatively thin, bendable sections of said piece of material.

6. Apparatus as defined in claim 4 wherein said material is an injection molded plastic material.

7. Apparatus for use with an inflatable vehicle occupant restraint, said apparatus comprising:

canister means for containing the restraint in a vehicle, said canister means defining a deployment opening through which the restraint moves outward when inflating;

a deployment door having a pivotal door panel; and chute means for defining a chute passage through which the inflating restraint moves outward between said deployment opening and said door panel, said chute means comprising a plurality of chute panels having initial positions and installed positions, said chute panels together having a flat, sheet-like configuration when in said initial positions, said chute panels defining peripheral sides of said passage when in said installed positions;

said chute means comprising means for defining a plurality of fold lines along which adjacent pairs of said chute panels are joined together, said chute panels being pivotal about said fold lines relative to each other upon movement of said chute panels from said initial positions to said installed positions;

said chute passage having a generally rectangular peripheral shape with four sides, said chute panels including first, second and third chute panels for defining first, second and third sides of said chute passage, respectively, said chute means further comprising a flange portion of said deployment door which projects inward from said pivotal door panel, said flange portion of said deployment door defining a fourth side of said chute passage.

8. Apparatus for use with an inflatable vehicle occupant restraint, said apparatus comprising:

canister means for containing the restraint in a vehicle, said canister means defining a deployment opening through which the restraint moves outward when inflating;

a deployment door having a pivotal door panel; and chute means for defining a chute passage through which the inflating restraint moves outward between said deployment opening and said door panel, said chute means comprising a plurality of chute panels having initial positions and installed positions, said chute panels together having a flat, sheet-like configuration when in said initial positions, said chute panels defining peripheral sides of said passage when in said installed positions;

said chute means comprising means for defining a plurality of fold lines along which adjacent pairs of said chute panels are joined together, said chute panels being pivotal about said fold lines relative to each other upon movement of said chute panels from said initial positions to said installed positions;

said chute means further comprising attachment means for fastening said chute panels to said deployment door and to said canister means.

9. Apparatus as defined in claim 8 wherein said attachment means comprises an attachment part for engaging said door panel, said attachment part being joined to one of said chute panels along a fold line and being pivotal about said fold line relative to said chute panels upon said movement of said chute panels from said initial positions to said installed portions.

10. Apparatus as defined in claim 9 wherein said attachment part is severable from said one of said chute panels along said fold line under the influence of the inflating restraint.

11. Apparatus as defined in claim 9 wherein said attachment part has openings for receiving fasteners.

12. Apparatus for use with an inflatable vehicle occupant restraint, said apparatus comprising:

a pivotal deployment door panel; and chute means for defining a chute passage through which the restraint moves toward said door panel when inflating;

said chute means comprising a plurality of chute panels having installed positions in which said chute panels define peripheral sides of said passage;

said chute means defining a plurality of fold lines along which adjacent pairs of said chute panels are joined together, said chute panels being pivotal about said fold lines relative to each other upon installation of said chute panels in said installed positions;

said chute means further comprising means for fastening said chute panels to said door panel.

13. Apparatus as defined in claim 12 wherein said chute means further comprises means for rupturing to release said door panel from said chute panels under the influence of the inflating restraint.

* * * * *